(12) United States Patent
Tuller et al.

(10) Patent No.: US 12,377,856 B1
(45) Date of Patent: Aug. 5, 2025

(54) OPTIMUM SHIFTING OF ELECTRIFIED POWERTRAIN SYSTEMS HAVING ELECTRIC MOTORS BEFORE AND AFTER A TRANSMISSION

(71) Applicant: FCA US LLC, Auburn Hills, MI (US)

(72) Inventors: Zachary L Tuller, Grand Rapids, MI (US); McKenzie Walsh, Auburn Hills, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/625,579

(22) Filed: Apr. 3, 2024

(51) Int. Cl.
*B60W 30/188* (2012.01)
*B60L 15/20* (2006.01)
*B60W 10/08* (2006.01)
*B60W 10/10* (2012.01)
*B60W 30/19* (2012.01)

(52) U.S. Cl.
CPC .......... *B60W 30/188* (2013.01); *B60L 15/20* (2013.01); *B60W 10/08* (2013.01); *B60W 10/10* (2013.01); *B60W 30/19* (2013.01); *B60L 2240/423* (2013.01); *B60L 2240/48* (2013.01); *B60W 2510/083* (2013.01); *B60W 2510/10* (2013.01); *B60W 2710/085* (2013.01); *B60W 2710/10* (2013.01)

(58) Field of Classification Search
CPC .... B60W 30/188; B60W 10/08; B60W 10/10; B60W 30/19; B60W 2510/083; B60W 2510/10; B60W 2710/085; B60W 2710/10; B60W 2710/271; B60W 2710/083; B60K 1/02; B60L 15/20; B60L 2240/423; B60L 2240/48

USPC .............................. 477/3, 15; 701/22, 53, 54
See application file for complete search history.

(56) References Cited

U.S. PATENT DOCUMENTS

| | | | |
|---|---|---|---|
| 9,156,344 B2 | 10/2015 | Tiwari et al. | |
| 9,469,294 B2 | 10/2016 | Takahashi et al. | |
| 9,862,374 B2 | 1/2018 | Jerwick | |
| 10,583,732 B2 | 3/2020 | Iwano | |
| 11,001,252 B2* | 5/2021 | Nakagawara | B60K 6/387 |
| 2004/0147365 A1* | 7/2004 | Komeda | B60W 30/19 |
| | | | 477/6 |
| 2005/0164827 A1* | 7/2005 | Beaty | B60W 10/11 |
| | | | 477/3 |

(Continued)

FOREIGN PATENT DOCUMENTS

CN 114475192 A 5/2022

*Primary Examiner* — Roger L Pang
(74) *Attorney, Agent, or Firm* — Jeremy J. Klobucar

(57) ABSTRACT

A control method for an electrified powertrain of an electrified vehicle having a first electric motor before a transmission and a second electric motor after the transmission includes receiving, by a control system and from a set of sensors, a set of operating parameters of the electrified powertrain, each operating parameter of the set of operating parameters relating to a torque split between the first and second electric motors, determining, by the control system, first and second optimal torque splits between the first and second electric motors for a transmission shift event by solving a torque split optimization problem based on the set of operating parameters, and controlling, by the control system, the first and second electric motors based on the first optimal torque split followed by the second optimal torque split relative to the transmission shift event.

8 Claims, 3 Drawing Sheets

(56) References Cited

U.S. PATENT DOCUMENTS

| | | | |
|---|---|---|---|
| 2007/0179014 A1* | 8/2007 | Endo | B60W 20/00 477/3 |
| 2010/0078238 A1* | 4/2010 | Oba | B60W 10/08 180/65.225 |
| 2022/0297538 A1 | 9/2022 | Lorenz et al. | |
| 2023/0114369 A1* | 4/2023 | Brudeli | F16H 61/0403 477/124 |

* cited by examiner

OPTIMUM SHIFTING OF ELECTRIFIED POWERTRAIN SYSTEMS HAVING ELECTRIC MOTORS BEFORE AND AFTER A TRANSMISSION

FIELD

The present application generally relates to electrified vehicles and, more particularly, to techniques for optimum shifting of electrified powertrain systems having electric motors before and after a transmission.

BACKGROUND

In electrified powertrains having multiple electric motors, the decision must be made as to how each motor is to contribute to vehicle propulsion, which is also known as a "torque split." This results in an optimization problem to determine a torque split that minimizes battery consumption and, in turn, maximizes vehicle range. In electrified powertrains with electric motors arranged both before and after a transmission (e.g., a multi-speed automatic transmission), the optimization problem becomes more difficult because the optimal torque split differs before, during, and after a transmission shift event. Conventional solutions to this problem include transitioning directly from a pre-shift desired torque split to a post-shift desired torque split at some time proximate to or during the shift event. These conventional solutions, however, are not fully optimized and thus do not fully minimize battery consumption and maximize vehicle range. Accordingly, while such conventional electrified powertrain control techniques do work for their intended purpose, there exists an opportunity for improvement in the relevant art.

SUMMARY

According to one example aspect of the invention, a control system for an electrified powertrain of an electrified vehicle, the electrified powertrain including a first electric motor before a transmission and a second electric motor after the transmission is presented. In one exemplary implementation, the control system comprises a set of sensors configured to monitor a set of operating parameters of the electrified powertrain, each operating parameter of the set of operating parameters relating to a torque split between the first and second electric motors and a control system configured to receive, from the set of sensors, the set of operating parameters, determine first and second optimal torque splits between the first and second electric motors for a transmission shift event by solving a torque split optimization problem based on the set of operating parameters, and control the first and second electric motors based on the first optimal torque split followed by the second optimal torque split relative to the transmission shift event.

In some implementations, the control system is configured is configured to control the first and second electric motors by (i) ramping from an initial torque split prior to the transmission shift event to the first optimal torque split and then (ii) ramping from the first optimal torque split to the second optimal torque split. In some implementations, the control system is configured to begin ramping from the initial torque split to the first optimal torque split before the transmission shift event. In some implementations, the control system is configured to continue ramping from the first optimal torque split to the second optimal torque split after the transmission shift event. In some implementations, the control system is configured to ramp from the initial torque split to the first optimal torque split only during a first speed or torque phase of the transmission shift event.

In some implementations, the control system is configured to ramp from the first optimal torque split to the second optimal torque split only during a second speed or torque phase of the transmission shift event. In some implementations, the ramping to/from the first optimal torque split includes holding a maximum second/first electric motor torque split for a period during a middle of the transmission shift event. In some implementations, the maximum second/first electric motor torque split is either (i) a predetermined amount from 100% post-transmission split or (ii) 100% post-transmission split indicating the transmission shift event transitioning through neutral. In some implementations, the first electric motor is arranged before a clutch of the transmission and the second electric motor is arranged after the clutch of the transmission. In some implementations, at least one of the first and second electric motors is integrated as part of the transmission.

According to another example aspect of the invention, a control method for an electrified powertrain of an electrified vehicle, the electrified powertrain including a first electric motor before a transmission and a second electric motor after the transmission is presented. In one exemplary implementation, the control method comprises receiving, by a control system and from a set of sensors, a set of operating parameters of the electrified powertrain, each operating parameter of the set of operating parameters relating to a torque split between the first and second electric motors, determining, by the control system, first and second optimal torque splits between the first and second electric motors for a transmission shift event by solving a torque split optimization problem based on the set of operating parameters, and controlling, by the control system, the first and second electric motors based on the first optimal torque split followed by the second optimal torque split relative to the transmission shift event.

In some implementations, the controlling of the first and second electric motors includes (i) ramping from an initial torque split prior to the transmission shift event to the first optimal torque split and then (ii) ramping from the first optimal torque split to the second optimal torque split. In some implementations, the controlling of the first and second electric motors includes beginning ramping from the initial torque split to the first optimal torque split before the transmission shift event. In some implementations, the controlling of the first and second electric motors includes continuing ramping from the first optimal torque split to the second optimal torque split after the transmission shift event In some implementations, the ramping from the initial torque split to the first optimal torque split, by the control system, is performed only during a first speed or torque phase of the transmission shift event.

In some implementations, the ramping from the first optimal torque split to the second optimal torque split, by the control system is performed only during a second speed or torque phase of the transmission shift event. In some implementations, the ramping to/from the first optimal torque split includes holding a maximum second/first electric motor torque split for a period during a middle of the transmission shift event. In some implementations, the maximum second/first electric motor torque split is either (i) a predetermined amount from 100% post-transmission split or (ii) 100% post-transmission split indicating the transmission shift event transitioning through neutral. In some implementations, the first electric motor is arranged before a clutch of the transmission and the second electric motor is arranged after the clutch of the transmission. In some implementations, at least one of the first and second electric motors is integrated as part of the transmission.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, in electrified powertrains with electric motors arranged both before and after a transmission (e.g., a multi-speed automatic transmission), a torque split optimization problem becomes more difficult because the optimal torque split differs before, during, and after a transmission shift event. Conventional solutions to this problem transition directly from a pre-shift desired torque split to a post-shift desired torque split at some time proximate to or during the shift event. These conventional solutions, however, are not fully optimized and thus do not fully minimize battery consumption and maximize vehicle range. In other words, this direct transition between two torque splits for a transmission shift event is sub-optimal. This problem is newly-identified as powertrain motor torque responses have significantly increased/improved. Accordingly, improved electrified powertrain control systems and methods are presented herein that leverage or take full advantage of the fact that the electric motor before the transmission (i.e., a pre-clutch motor) is less efficient or more inefficient than the electric motor after the transmission (i.e., a post-clutch motor), particularly during the shift while the torque and speed ratios are different.

The losses come from multiple sources including converting energy to heat with the slipping clutch(es) during a shift and the electric motor at the input of the transmission running at a less efficient speed and torque ratio partway through the shift than the electric motor not during a shift. Accounting for the above results in multiple changes in the optimal torque split throughout or during the shift event rather than a single, direct transition between two values as performed by conventional electrified powertrain control systems and methods. In other words, there is actually at least a third optimal point during the shift event and the techniques of the present application perform two torque split transitions—one before or during a first portion of the shift event (or both) and the other during a second portion or after the shift event (or both). The specific torque split points are determined by solving an optimization problem online or offline based on a variety of different operating parameters. For example, the optimization problem could be solved using the well-known donut space method.

Figure 1:
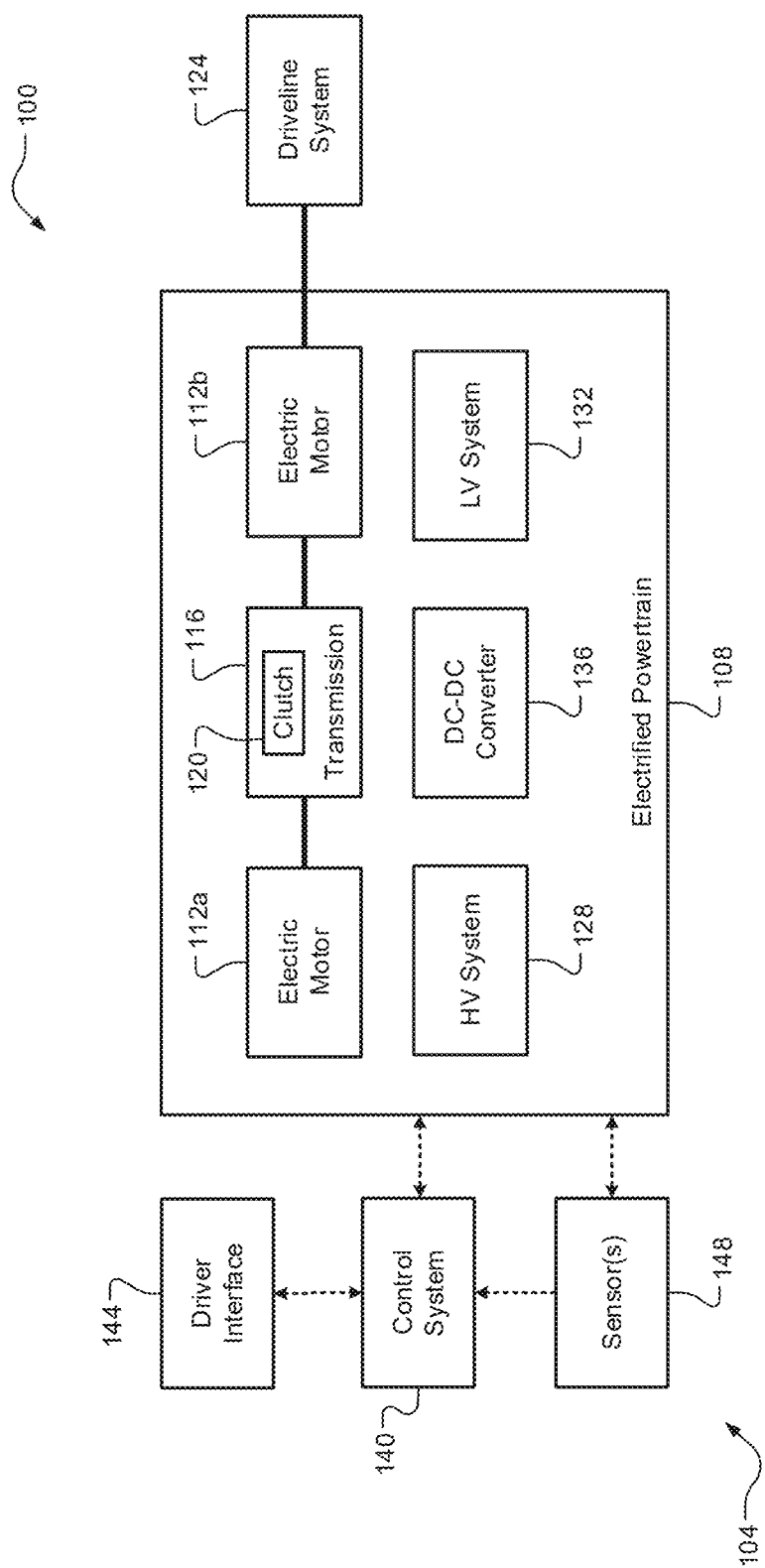
FIG. 1 is a functional block diagram of an electrified vehicle having an example electrified powertrain control system according to the principles of the present application.

Referring now to FIG. 1, a functional block diagram of an electrified vehicle 100 having an example control system 104 for an electrified powertrain 108 according to the principles of the present application is illustrated. The electrified powertrain 108 includes at least a first electric motor 112a and a second electric motor 112b arranged on opposing sides of a transmission 116 (e.g., a multi-speed step-gear automatic transmission). The transmission 116 is comprises a plurality of clutches 120 that can be hydraulically actuated to achieve a desired gear or gear ratio through the transmission 116. A driveline system 124 a differential, half-shafts or axles, wheels, etc.) is arranged on an output or downstream side of the transmission 116. The electrified powertrain 108 is configured to generate drive torque using the first and second electric motors 112a, 112b that is output to the driveline system 124 for vehicle propulsion. The electrified powertrain 108 further includes a high voltage system 128 (e.g., a high voltage bus, a high voltage battery pack or system, and a high voltage contactor therebetween) configured to provide high voltage power to the electric motors 112a, 112b, a low voltage system 132 (e.g., a 12V battery), and a direct current to direct current (DC-DC) converter 136 therebetween.

While only two electric motors 112a, 112b (collectively, "electric motors 112) are shown in FIG. 1 and specifically described herein, it will be appreciated that the electrified powertrain 108 could include other torque/energy generation systems such as one or more additional electric motors, an internal combustion engine, a fuel cell system, and the like. For example only, the electrified powertrain 108 could have any of the following configurations: (1) P0 (P1f), P1 (P1r), or P2 electric motors on an input-side of the transmission 116 and P3, P4, or hub electric motors on an output-side of the transmission 116; (2) battery electric vehicle (BEV), fuel cell electric vehicle (FCEV), and hybrid electric vehicle (HEV) type configurations; (3) motors/engines/transmissions on one or multiple vehicle axles; and (4) multiple electric motors before and/or after the transmission 116 (a four motor system—P1, P2, P4, P4, a three motor system—P2, P4, P4, etc.). In addition, while shown as being separate from the transmission 116, it will be appreciated that one or both of the electric motors 112 could be integrated as part of the transmission 116 (i.e., on respective input/output sides of the clutch(es) 120). Again, it will be appreciated that these are merely examples and that the electrified powertrain 108 could have any suitable configuration.

A controller or control system 140 controls operation of the electrified vehicle 100 and, more particularly, controls the electrified powertrain 108 such that the electrified powertrain 108 generates and transfers a desired amount of drive torque to the driveline system 124 to satisfy a driver torque request. The driver torque request could be provided by a driver of the electrified vehicle 100 via a driver interface 144 (e.g., an accelerator pedal or similar device). The control system 148 also includes a set of sensors 148 that are configured to measure operating parameters of the electrified vehicle 100 (the electrified powertrain 108) as part of the control thereof. Non-limiting examples of these parameters include torques/speeds of rotating shafts (electric motors 112, input/output shafts of the transmission 116, etc.), currents/voltages of various electrical systems (the high voltage system 128, the low voltage battery 132, etc.), and pressures and/or temperatures (the clutch(es) 120, the electric motors 112, etc.). In one exemplary implementation, the control system 140 and the sensor(s) 148 collectively form the electrified powertrain control system 104.

Picking an optimal motor split should take into consideration one or more of the following non-limiting list of parameters: (1) torque limits of the electric motors 112, (2) power limits of the electric motors 112, (3) power limits of the battery/batteries 128, 132, (4) electrical losses through the high voltage system 128 (motors, batteries, inverters, etc.), (5) current driver torque demand (e.g., from driver interface 144), (6) configuration of the driveline system 124 (torque ratios between actuators/wheels), (7) state of the transmission 116, (8) torque limits to maintain traction/stability (e.g., an electronic stability control, or ESC system), and (9) lash limits of the driveline system 124. Some of these parameters may also change with vehicle speed, electric motor speed, or other operating characteristics of the electrified powertrain 108. In general, the optimal split will vary smoothly with vehicle speed and accelerator pedal position as long as the transmission 116 remains fixed in one gear. If the transmission 116 changes gears, however, then the optimal (lowest power consumption) electric motor split is different on either side of the transmission shift event. This means that changing torque split during, before, or after the shift must be managed in order to drive the electrified vehicle 100 with the lowest power consumption.

Figure 2:
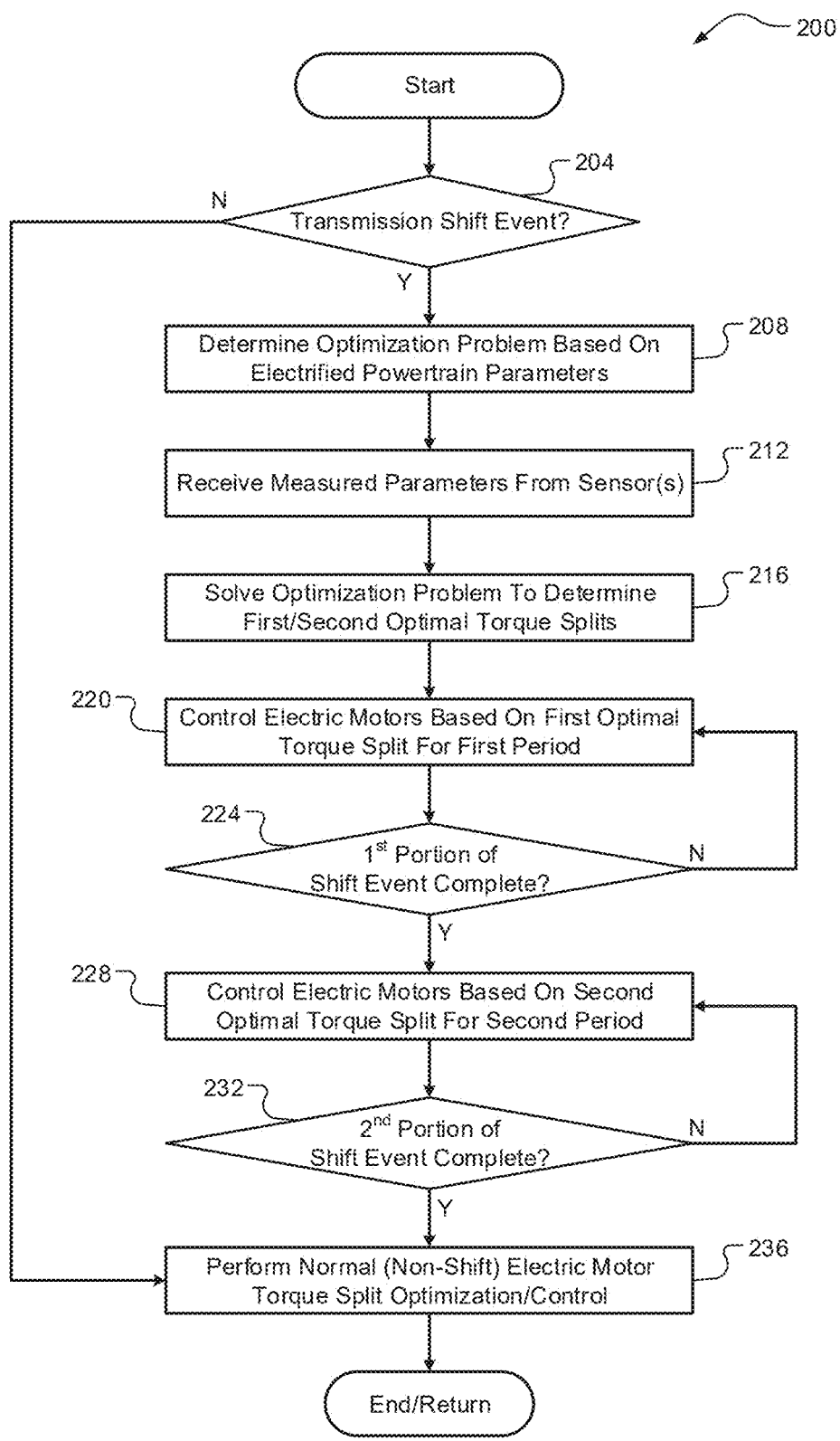
FIG. 2 is a flow diagram of an example control method for an electrified powertrain of an electrified vehicle according to the principles of the present application.
Figure 3A:
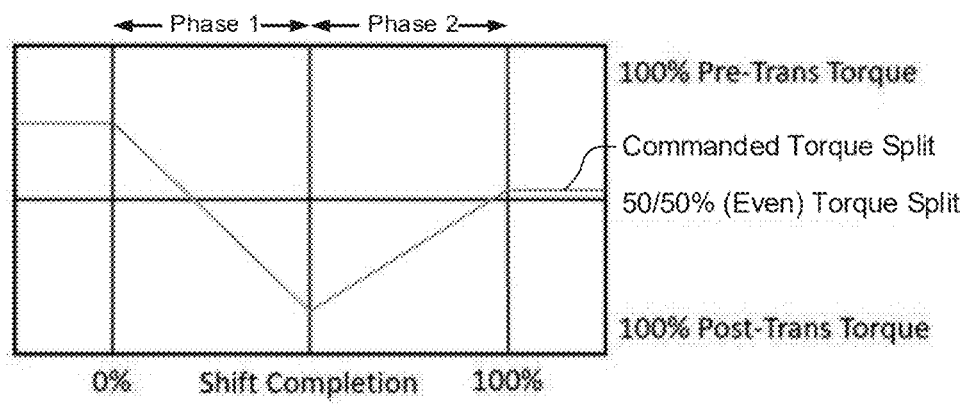
FIGS. 3A-3D are plots of example optimized torque split control before, during, and after an example transmission shift event according to the principles of the present application.
Figure 3B:
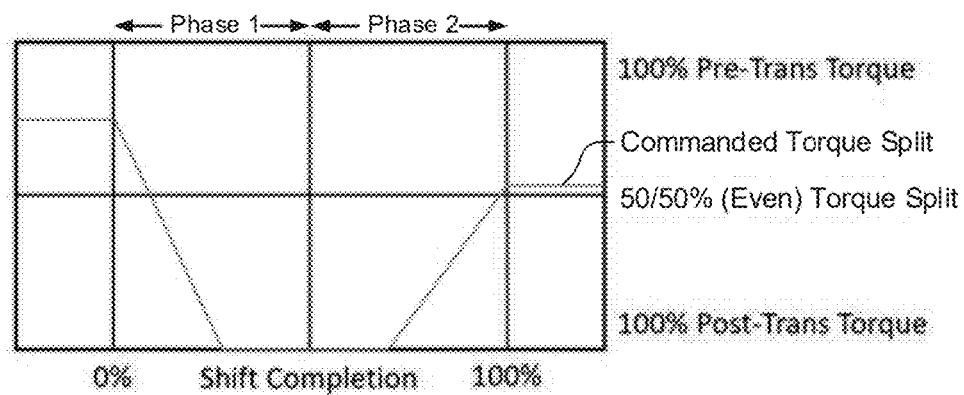
Figure 3C:
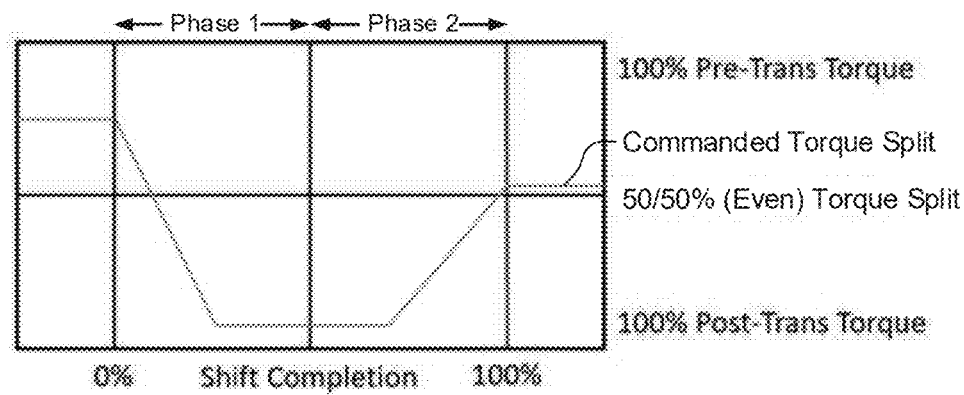
Figure 3D:
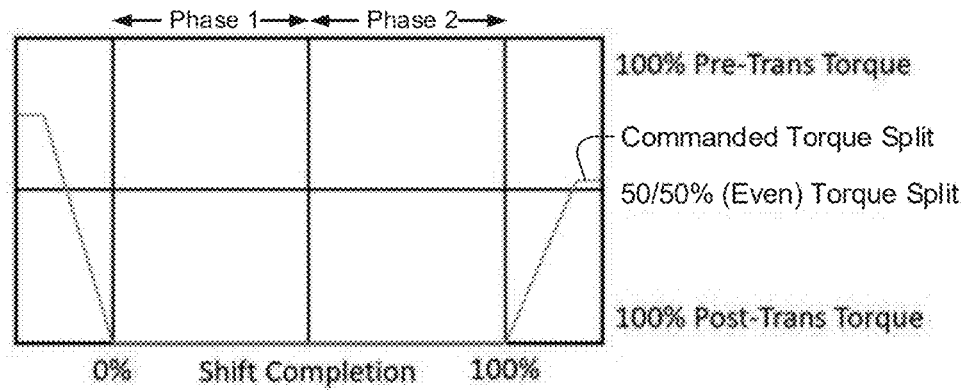

Referring now to FIG. 2, a flow diagram of an example control method 200 for an electrified powertrain of an electrified vehicle according to the principles of the present application is illustrated. FIGS. 3A-3D, which illustrate plots of example optimized torque split control before, during, and after an example transmission shift event according to the principles of the present application, are also referenced. While the electrified vehicle 100 and its components are specifically referenced for descriptive/illustrative purposes, it will be appreciated that the method 200 could be applicable to any suitably configured electrified vehicle. The method 200 begins at 204. At 204, the control system 140 determines whether a transmission shift event is upcoming or imminent. This could be determined, for example, based on a change in the driver torque demand provided by a driver via the driver interface 144 and other measured parameters from the sensor(s) 148 (e.g., vehicle/motor speeds). For example, a transmission control module (TCM) specifically associated with the transmission 116 could notify another supervisory controller of the control system 140 (e.g., an electrified vehicle control unit, or EVCU) of the transmission shift event. When false, the method 200 proceeds to 232. When true, the method 200 proceeds to 208.

At 208, the control system 140 determines an optimization problem based on a set of parameters of the electrified powertrain 108. This optimization problem could be predefined and could specify a plurality of parameters that each affect energy (e.g., current) consumption of the electrified vehicle 100, which is to be minimized. At 212, the control system 140 receives the measured parameters from the sensor(s) 148. At 216, the control system 140 solves the optimization problem (e.g., minimized energy consumption) to determine first and second optimal torque splits. The solving of the optimization problem could be performed online in real-time or could be performed offline and stored as empirical data (e.g., in lookup tables). As previously mentioned, this optimization could be determined using the well-known donut space method. At 220, the control system 140 controls the first and second electric motors 112a, 112b first based on the first optimal torque split for a first period. This first period could begin at a start of the transmission shift event (see FIGS. 3A-3C) or prior to the start of the transmission shift event (see FIG. 3D). The first period then continues until, for example, a midway point of the transmission shift event, which could be through the completion of a speed phase or a torque phase (depending on whether the transmission shift event is an upshift or a downshift).

The control of the first and second electric motors 112a, 112b based on the first optimal torque split includes ramping (e.g., linearly ramping) from an initial (pre-shift) torque split to the first optimal torque split. In some cases, the torque split is ramped to the first optimal torque split and then immediately begins changing (ramping) to the second optimal torque split (see FIG. 3A) whereas in other cases the torque split is temporarily held steady/flat at the first optimal torque split for a period before later changing (ramping) to the second optimal torque split (see FIGS. 3B-3D). In some cases, the first optimal torque split defines a point that is at a maximum torque split, as can be seen in FIS. 3B-3D. In these examples, the first optimal torque split is 100% for electric motor 112b and 0% for electric motor 112a. As can be seen in FIGS. 3A-3D, the transitions (ramping) from the first optimal torque split to the second optimal torque split can occur in a similar but opposite manner as the transitions (ramping) from the initial torque split to the first optimal torque split. At 224, the control system 140 determines whether the first portion (e.g., the first period) of the transmission shift event is complete. When false, the method 200 returns to 220. When true, the method 200 proceeds to 228. At 228, the control system 140 subsequently controls the electric motors 112a, 112b based on the second optimal torque split for a second period.

At 232, the control system 140 determines whether the second portion of the transmission shift event is complete. When false, the method 200 returns to 228. When true, the method 200 proceeds to 236. At 236, the control system 140 transitions (back) to performing normal (non-shift) torque split control of the torques for the first and second electric motors 112a, 112b. The method 200 then ends or returns to 204, such as for another transmission shift event. In all of illustrated cases if FIGS. 3A-3D, the goal is to manage the transmission shift event so that it performs the best at a variety of considerations such as the following non-limiting list: (1) minimizing battery energy consumption, (2) maximizing vehicle acceleration, (3) driving smoothly with respect to driveline lash, (4) controlling the system within actuator limits, and (5) controlling the system within traction/stability control limits. This optimization-based transmission shifting strategy of the present application optimizes battery power consumption and improves vehicle acceleration in power constrained shift scenarios. By partially or fully offloading the electric motor torque through the transmission to the electric motor arranged after the transmission's output during the shift the battery power consumed by the electric motors is optimized during the shift. This optimization strategy improves energy efficiency by reducing losses during the torque and speed phases of the gear shift.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrified powertrain of an electrified vehicle, the electrified powertrain including a first electric motor before a transmission and a second electric motor after the transmission, the control system comprising:
a set of sensors configured to monitor a set of operating parameters of the electrified powertrain, each operating parameter of the set of operating parameters relating to a torque split between the first and second electric motors; and
a control system configured to:
receive, from the set of sensors, the set of operating parameters;
determine first and second optimal torque splits between the first and second electric motors for a transmission shift event by solving a torque split optimization problem based on the set of operating parameters; and
control the first and second electric motors based on the first optimal torque split followed by the second optimal torque split relative to the transmission shift event,
wherein the control system is configured is configured to control the first and second electric motors by (i) linearly ramping from an initial torque split prior to the transmission shift event to the first optimal torque split and then (ii) linearly ramping from the first optimal torque split to the second optimal torque split.

2. The control system of claim 1, wherein the control system is configured to ramp from the initial torque split to the first optimal torque split only during a first speed or torque phase of the transmission shift event.

3. The control system of claim 2, wherein the control system is configured to ramp from the first optimal torque split to the second optimal torque split only during a second speed or torque phase of the transmission shift event.

4. The control system of claim 1, wherein the first electric motor is arranged before a clutch of the transmission and the second electric motor is arranged after the clutch of the transmission.

5. A control method for an electrified powertrain of an electrified vehicle, the electrified powertrain including a first electric motor before a transmission and a second electric motor after the transmission, the control method comprising:
receiving, by a control system and from a set of sensors, a set of operating parameters of the electrified powertrain, each operating parameter of the set of operating parameters relating to a torque split between the first and second electric motors;
determining, by the control system, first and second optimal torque splits between the first and second electric motors for a transmission shift event by solving a torque split optimization problem based on the set of operating parameters; and
controlling, by the control system, the first and second electric motors based on the first optimal torque split followed by the second optimal torque split relative to the transmission shift event,
wherein the controlling of the first and second electric motors includes (i) linearly ramping from an initial torque split prior to the transmission shift event to the first optimal torque split and then (ii) linearly ramping from the first optimal torque split to the second optimal torque split.

6. The control method of claim 5, wherein the ramping from the initial torque split to the first optimal torque split, by the control system, is performed only during a first speed or torque phase of the transmission shift event.

7. The control method of claim 6, wherein the ramping from the first optimal torque split to the second optimal torque split, by the control system is performed only during a second speed or torque phase of the transmission shift event.

8. The control method of claim 5, wherein the first electric motor is arranged before a clutch of the transmission and the second electric motor is arranged after the clutch of the transmission.

* * * * *